United States Patent
Choi

(10) Patent No.: US 7,597,801 B2
(45) Date of Patent: Oct. 6, 2009

(54) FLUIDS FLUXION METHOD AND PLANT FOR WASTEWATER TREATMENT

(75) Inventor: Hong-Bok Choi, Seoul (KR)

(73) Assignee: EcoDays Co., Ltd., Nowon-gu, Seoul (KR)

( * ) Notice: Subject to any disclaimer, the term of this patent is extended or adjusted under 35 U.S.C. 154(b) by 350 days.

(21) Appl. No.: 11/570,418

(22) PCT Filed: Jun. 15, 2004

(86) PCT No.: PCT/KR2004/001419

§ 371 (c)(1),
(2), (4) Date: Dec. 11, 2006

(87) PCT Pub. No.: WO2005/123613

PCT Pub. Date: Dec. 29, 2005

(65) Prior Publication Data

US 2008/0264840 A1    Oct. 30, 2008

(51) Int. Cl.
*C02F 11/02* (2006.01)
*B01F 3/04* (2006.01)
(52) U.S. Cl. ............... 210/151; 210/194; 210/205; 210/218; 210/220; 210/522; 210/539; 261/113; 261/114.3
(58) Field of Classification Search ............. 210/120, 210/205, 207, 220, 188, 603, 620, 621, 622, 210/150, 151, 218, 221.1, 221.2, 522, 532.1, 210/537, 539, 540; 261/108, 109, 110, 113, 261/114.1, 114.2, 114.5, 126, 123, 114.3, 261/121.1, 124, DIG. 70

See application file for complete search history.

(56) References Cited

U.S. PATENT DOCUMENTS

| 2,889,929 | A  | * | 6/1959  | Kivell ................... 210/603 |
| 6,123,323 | A  | * | 9/2000  | Yoneda et al. .......... 261/113 |
| 6,478,963 | B1 | * | 11/2002 | Rossmanith ............ 210/603 |
| 2003/0057152 | A1 | * | 3/2003 | Haridas .................. 210/603 |

FOREIGN PATENT DOCUMENTS

| JP | 51-36669    | 3/1976  |
| JP | 10-118473   | 5/1998  |
| JP | 11-319866   | 11/1999 |
| JP | 2000-254637 | 9/2000  |
| KR | 2004-64579  | 7/2004  |

* cited by examiner

*Primary Examiner*—Matthew O Savage
*Assistant Examiner*—Lucas Stelling
(74) *Attorney, Agent, or Firm*—Lexyoume IP Group, LLC.

(57) ABSTRACT

A wastewater treatment plant includes a reaction tank connected to an wastewater supply tube and an aeration apparatus to receive wastewater therein, a sludge separation unit dividing an internal space of the reaction tank into upper and lower sections to increase an amount of dissolved oxygen by increasing an contact area of the wastewater and bubbles and to separate relatively light materials by moving low density matters existed on a surface of each section upward in turn, an air exhaust tube mounted on the reaction tank to exhaust bubbles passing through the sludge separation unit out of the reaction tank, a treated water exhaust tube mounted on the reaction tank to exhaust the wastewater that is treated by passing through the sludge separation unit, and a settling tank provided on a bottom of the reaction tank to concentrate and exhaust the settled sludge.

14 Claims, 9 Drawing Sheets

US 7,597,801 B2

FLUIDS FLUXION METHOD AND PLANT FOR WASTEWATER TREATMENT

BACKGROUND OF THE INVENTION (a) Field of the Invention

The present invention relates to a wastewater treatment plant, and more particularly, to a wastewater treatment plant that can improve the wastewater treatment efficiency by providing a sludge separation unit in a reaction tank, injecting gas or air into the wastewater separation unit to increase the gas stay time in the wastewater, and decomposing and separating the sludge using a density difference by separating a gas layer from the wastewater.

(b) Description of the Related Art

Generally, a wastewater treatment is a process for converting polluted matters contained in water into stable matters through a microbiological reaction or a chemical oxidation/reduction reaction and for separating untreated residual matters.

Therefore, the wastewater treatment is a technology for the water quality and stabilizing and separating organic matters and nutrition matters. To date, the wastewater treatment is performed by mostly a biological treatment process, which is inexpensive.

However, a conventional treatment process has a disadvantage in that the treatment is very slow and unstable as it depends on an organic decomposition under a natural condition.

Therefore, a key point of the wastewater treatment technology is to analyze factors affecting on the wastewater treatment and to control an element restricting the interaction of the factors.

However, since most of the conventional wastewater treatment plants are designed to attach weight to only a reaction process among a variety of core processes such as a gas transmitting process, the reaction process, and a matter separation process, there is a limitation in improving the treatment efficiency.

SUMMARY OF THE INVENTION

The present invention provides a wastewater treatment plant that can improve the wastewater treatment efficiency by providing a sludge separation unit in a reaction tank, injecting gas or air into the wastewater separation unit to increase the gas stay time in the wastewater, and decomposing and separating the sludge using a density difference by separating a gas layer from the wastewater. In addition, the present invention provides a wastewater treatment plant that is practical, economical, functional, and easy in manufacture while overcoming the problems of the prior art.

DETAILED DESCRIPTION OF THE PREFERRED EMBODIMENTS

In view of the foregoing description, it is an objective of the present invention to provide a wastewater treatment plant that can stably improve the treatment efficiency of wastewater using density and viscosity properties of liquid material by mounting a unit for separating low density matters and bubbles to increase the air staying time in a reaction tank and to vary the material transmission.

It is another objective of the present invention to provide a wastewater treatment plant that can improve solubility of wastewater and air by employing a guide member.

It is still another objective of the present invention to provide a wastewater treatment plant that can circulate sludge stored in a reaction tank in a vertical direction by employing a circulating unit.

It is still another objective of the present invention to provide a wastewater treatment plant that can be operated as an anoxic tank by providing an air-exhausting unit.

It is still yet another objective of the present invention to provide a wastewater treatment plant that can effectively separate foreign objects contained in the wastewater by making a density difference using gas such as ozone as well as air.

To achieve the above objectives, the present invention provides a wastewater treatment plant includes a reaction tank connected to an wastewater supply tube and an aeration apparatus to receive wastewater therein, a sludge separation unit dividing an internal space of the reaction tank into upper and lower sections to increase an amount of dissolved oxygen by increasing an contact area of the wastewater and bubbles and to separate relatively light materials by moving low density matters existed on a surface of each section upward in turn, an air exhaust tube mounted on the reaction tank to exhaust bubbles passing through the sludge separation unit out of the reaction tank, a treated water exhaust tube mounted on the reaction tank to exhaust the wastewater that is treated by passing through the sludge separation unit, and a settling tank provided on a bottom of the reaction tank to concentrate and exhaust the settled sludge.

Preferred embodiments of the present invention will be described hereinafter in conjunction with the accompanying drawings.

Figure 1:
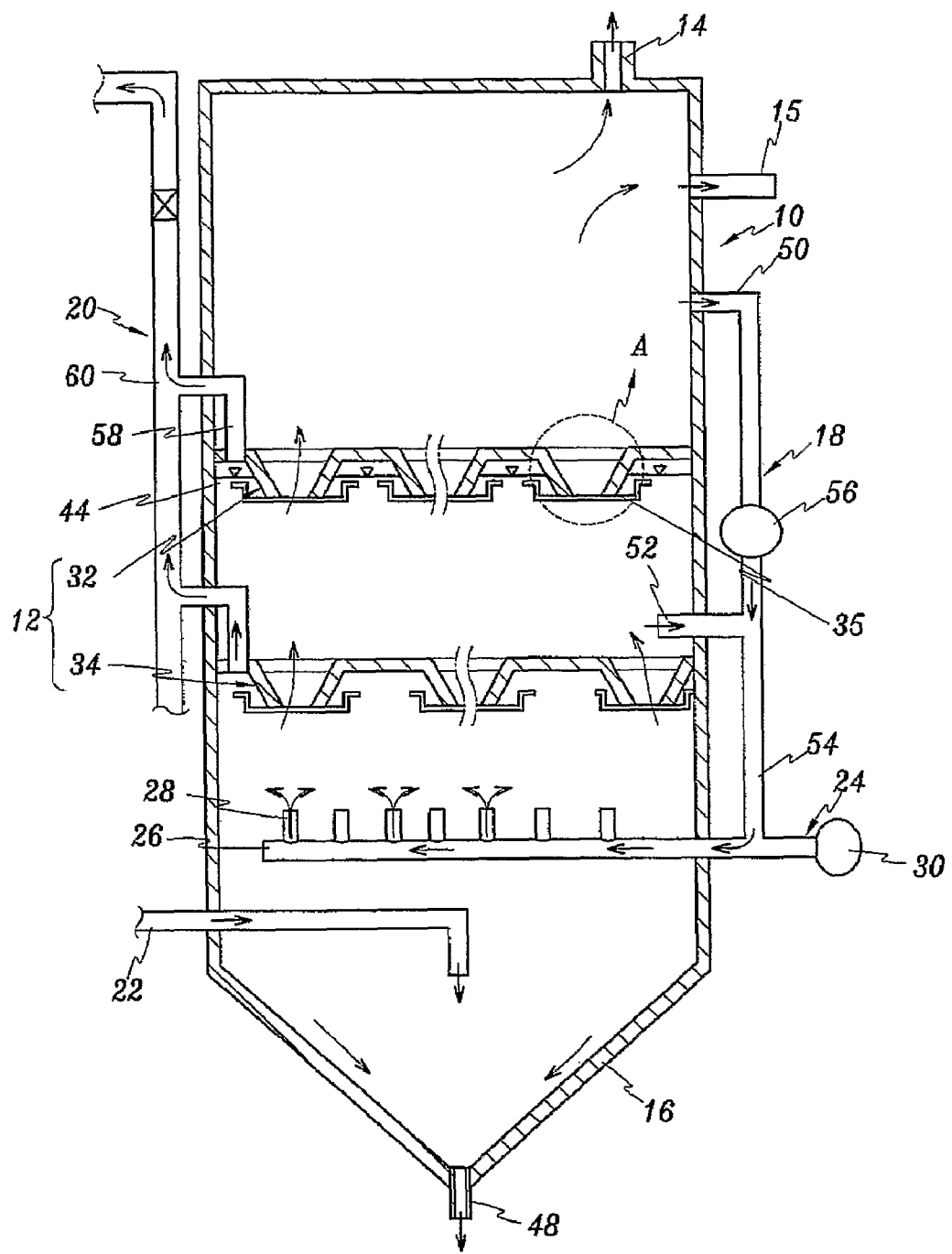
FIG. 1 is a side sectional view of a wastewater treatment plant according to a preferred embodiment of the present invention.
Figure 2:
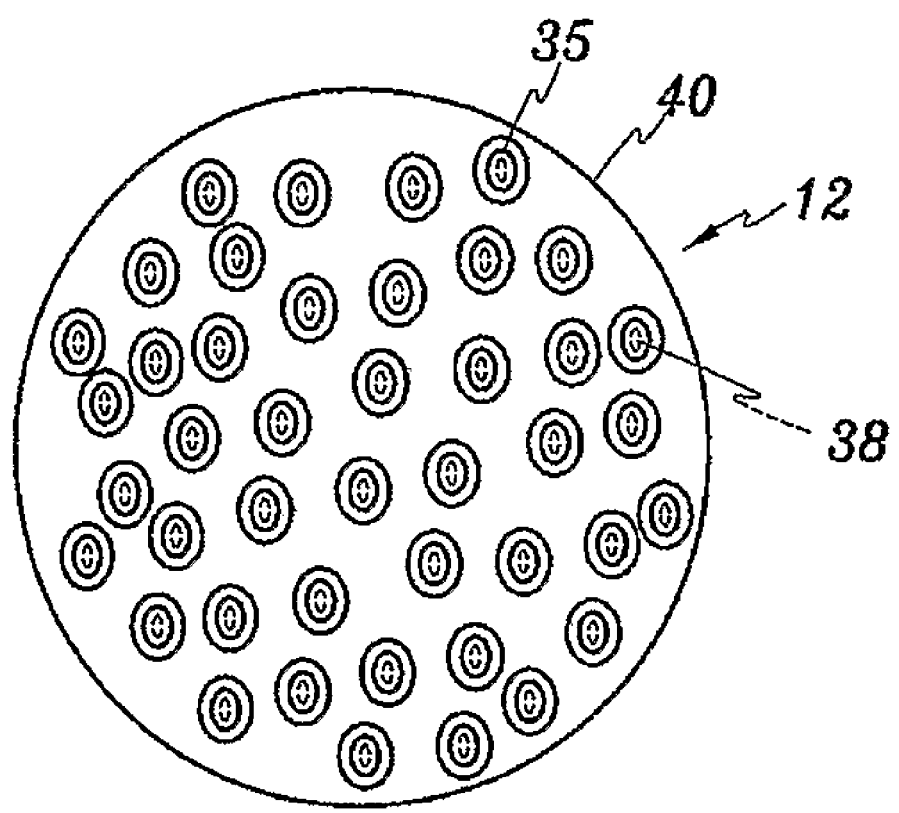
FIG. 2 is a plane view of a sludge separation unit depicted in FIG. 1.

As shown in FIG. 1, the inventive wastewater treatment includes a reaction tank 10 into which waste water and air are introduced, more than one sludge separation unit 12 for decomposing a contaminant by dividing the space of the reaction tank 10 into upper and lower sections, moving the introduced wastewater and air bubbles upward in order of density, and increasing an amount of dissolved oxygen by increasing a contacting area between the wastewater and the air bubbles, an air exhausting tube 15 extending from the reaction tank 10 to exhaust air bubbles passing through the sludge separation unit 12, a treated water exhausting tube 15 extending from the reaction tank 10 to exhaust the wastewater that is treated while passing through the sludge separation unit 12, and a settling tank 16 provided on a lower portion of the reaction tank 10 to concentrate and exhaust the sludge settled on the bottom of the reaction tank 10.

In the above-described wastewater treatment plant, the reaction tank 10 is formed in a container type defining a predetermined chamber so that the wastewater and air are introduced and stored in the chamber.

The wastewater and air are fed into the reaction tank 10 via a wastewater supply tube 22 and an aeration apparatus 24.

That is, the wastewater supply tube 22 is formed extending from a lower portion of the reaction tank 10 to supply the wastewater from an external side into the reaction tank 10. Accordingly, the wastewater introduced through the wastewater supply tube 22 is filled in the reaction tank 10 from the bottom of the tank. At this point, the sludge having more than a predetermined weight is settled in the settling tank 16.

The aeration apparatus 24 is mounted above the wastewater supply tube 22 to supply outer air into the reaction tank 10.

The aeration apparatus 24 is provided at a first end located inside the reaction tank 10 with at least one nozzle 28 and at a second end located outside the reaction tank 10 with a blower 30.

Accordingly, the air forced into the aeration apparatus 24 by the blower 30 is uniformly sprayed to the wastewater through the nozzles 28.

Meanwhile, the sludge separation unit 12 includes at least one, preferably first and second sludge separation parts 34 and 32. The first and second sludge separation parts 34 and 32 are identical to each other in a shape. Therefore, the description will be done just for the first sludge separation part 34.

The sludge separation part 34, as shown in FIGS. 2 through 5a, divides the chamber of the reaction tank 10 into upper and lower sections, including at least one plate 40 provided with a plurality of through holes 38, a plurality of fluid flowing tubes 42 extending downward from the bottom of the plate 40 to allow the wastewater and air to pass therethrough, and a guide member 35 provided under the fluid flowing tubes 42 to improve the fluidity of the air.

In the above-described sludge separation unit 12, it is preferable that the through holes 38 formed on the plate 40 are uniformly distributed. For uniformly distributing the through holes 38, the wastewater and air can be uniformly distributed. Furthermore, the through holes 38 may be formed on a specific portion and formed in a predetermined arrangement.

In addition, the fluid flowing tubes 42 communicate with the through holes 38. It is preferable that the fluid flowing tube 42 is funnel-shaped where an upper area thereof is greater than a lower area thereof.

Accordingly, the wastewater and air introduced into the funnel-shaped fluid flowing tubes 42 are distributed in a sector form while ascending along the fluid flowing tubes 42. As a result, the sludge contained in the wastewater is settled near the fluid flowing tubes 42.

The fluid flowing tubes 42 extends toward the bottom of the plate 40 by a predetermined length, a plurality of staying spaces 44 and 46 enclosed by the fluid flowing tubes 42 are defined on the bottom of the plate 40.

Therefore, the air ascending from the bottom of the reaction tank 10 is collected in the staying spaces 44 and 46. When a predetermined amount of the air is collected in the staying spaces 44 and 46, the air is dispersed in all directions by pressure to be directed to the fluid flowing tube 42.

The fluid flowing tube 42 may be formed by punching the plate 40 using, for example, a wedge or may be separately prepared and integrally coupled to the plate 40 by, for example, welding.

In addition, the guide member 35 is formed in a concave-shape so that fluid cannot directly pass through the fluid flowing tube 42 and detour into the guide member 35 and into the fluid flowing tube 42.

The guide member 35 includes a bottom plate 36 connected to the fluid flowing tube 42 and an edge plate 37 formed in a lateral direction from the edge of the bottom plate 36 to guide the wastewater and air into the bottom plate 36.

The bottom plate 36 is provided with a connecting bar 39 projected upward to be integrally connected to the fluid flowing tube 42. Therefore, the guide member 35 may be provided to the fluid flowing tube 42.

As a result, the wastewater and air rising from the bottom is directed into the guide member 35 through a space D defined between the edge plate 37 of the guide member 35 and the surface of the wastewater.

At this point, in the course of directing the wastewater and air into the guide member 35 through the space D, the wastewater and air contact with air in the staying spaces 44 and 46 in order to increase the gas-liquid ratio, thereby increasing the dissolving speed of gas having low solubility.

In addition, by properly adjusting a length of the edge plate 37, the solubility of the wastewater and air introduced through the space D can be improved.

As described above, the wastewater and air introduced into the guide member 35 is improved in their solubility and directed to the fluid flowing tube 42.

Figure 5A:
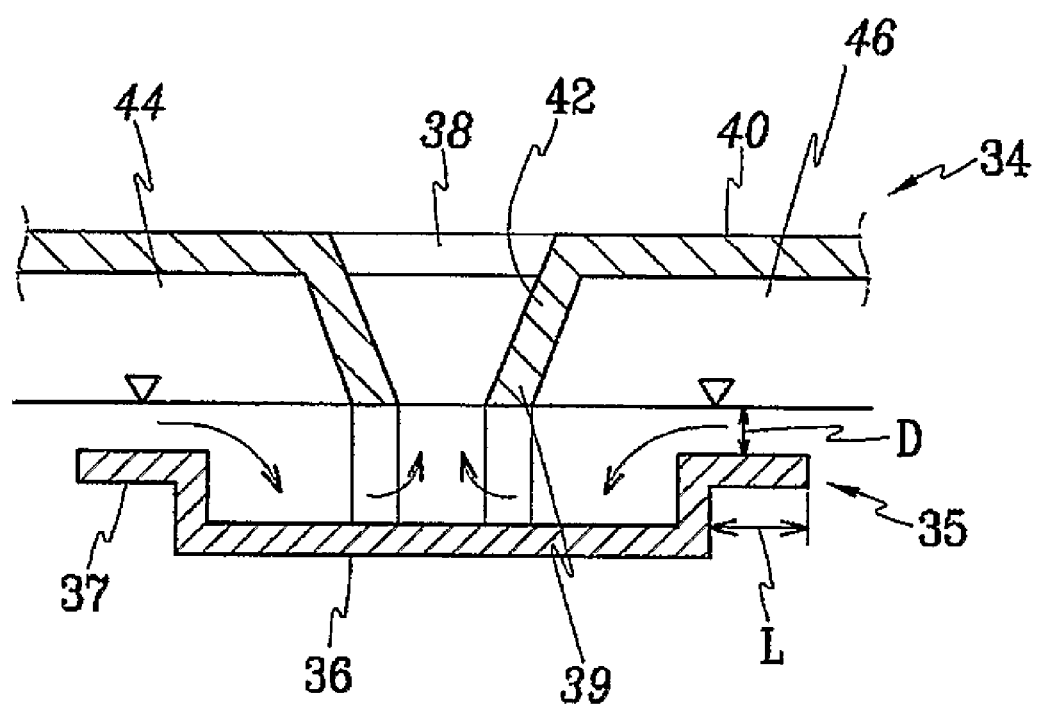
FIG. 5(a) is a partly enlarged sectional view of a portion "A" of FIG. 1.
Figure 5B:
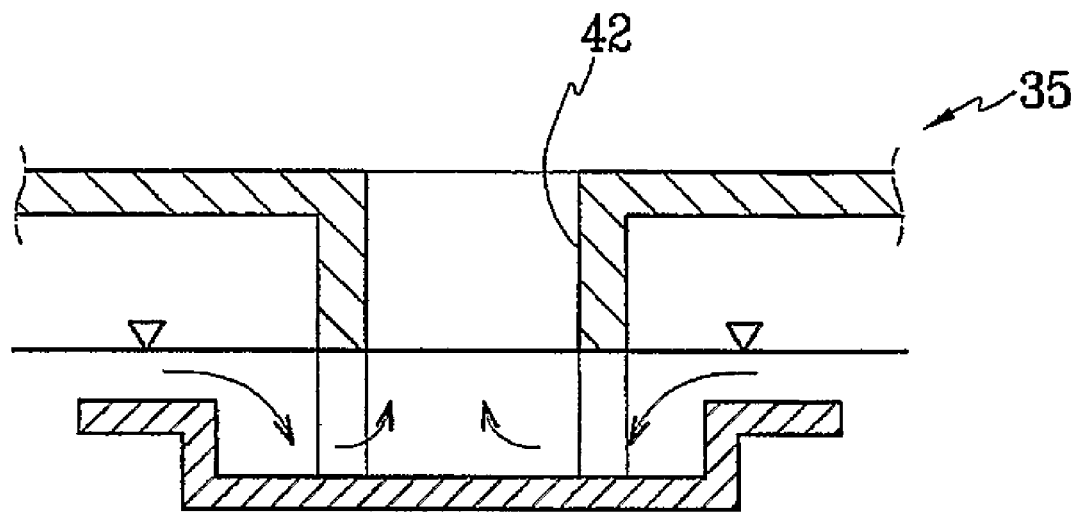
FIG. 5(b) is a partly enlarged sectional view of a modified example of a sludge separation unit depicted in FIG. 5(a)

In the above description, although a shape of the fluid flowing tube 42 provided on the sludge separation part 34 is inclined. However, the present invention is not limited to this case. For example, as shown in FIG. 5(b), the fluid flowing tube 42 may be formed in a vertical shape.

Figure 3:
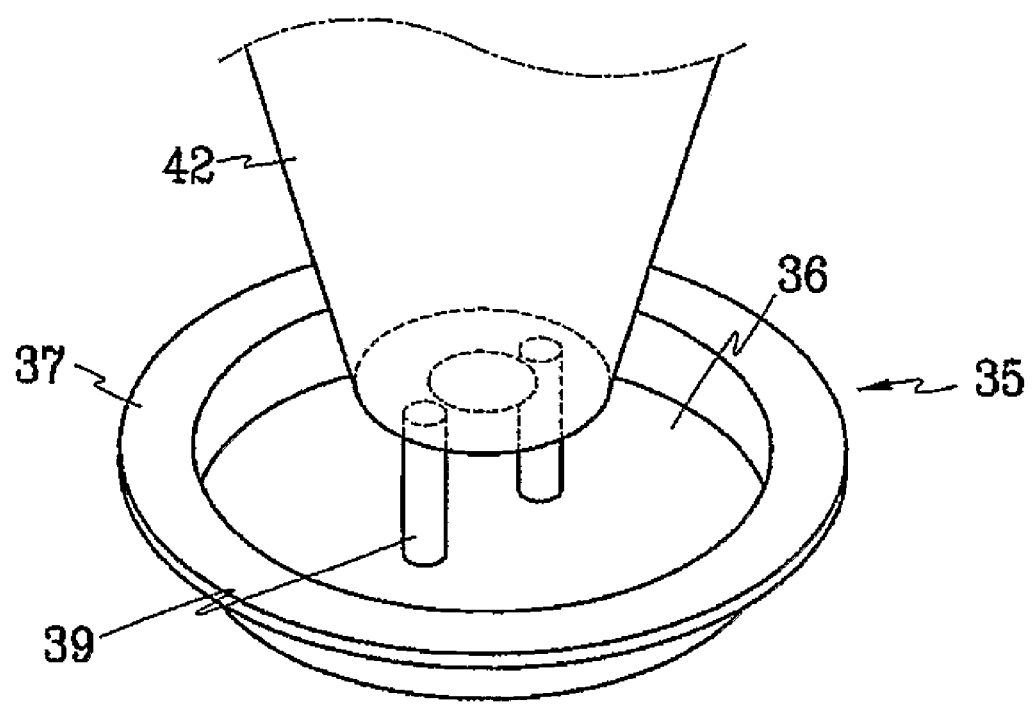
FIG. 3 is a partly enlarged perspective view of a portion "A" of FIG. 1.
Figure 4:
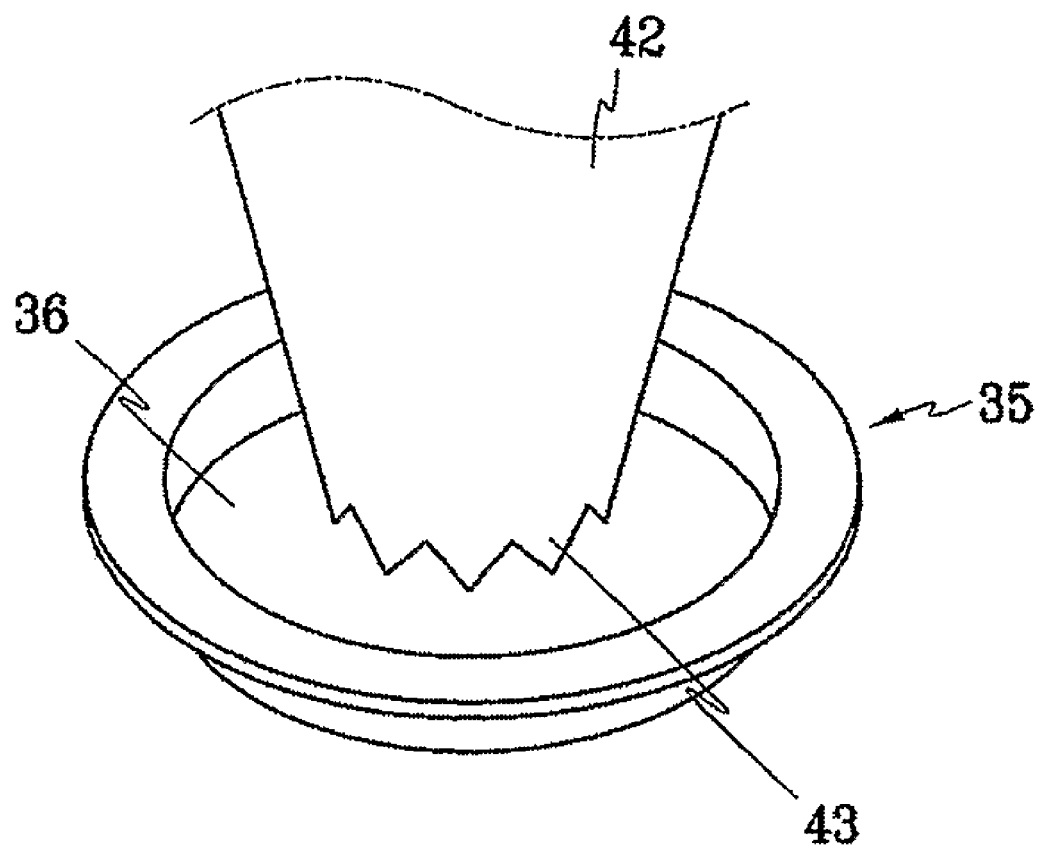
FIG. 4 is a partly enlarged perspective view of a modified example of a portion "A" depicted in FIG. 3.

Meanwhile, the connecting bar 39 connecting the guide member 35 to the fluid flowing tube 42 is not limited to the shape as in FIG. 3. That is, as shown in FIG. 4, the connecting bare 39 may be formed by forming a lower end of the fluid flowing tube 42 in a saw tooth shape 43.

By forming the lower end of the fluid flowing tube 42 in the saw tooth shape 43, a small of the fluid passes consecutively through the fluid flowing tube 42 to improve the gas dissolving speed.

As described above, when the wastewater and air ascends to reach the sludge separation unit 12, they moved to the upper section of the sludge separation unit through the guide member 35 and the fluid flowing tubes 42.

Meanwhile, the air exhaust tube 14 and the treated water exhaust tube 15 are mounted on the upper portion of the reaction tank 10. In addition, the wastewater and air ascending through the first and second sludge separation parts 34 and 32 are exhausted out of the reaction tank 10 through the air exhaust tube 14 and the treated water exhaust tube 15.

In addition, the settling tank 16 is mounted on the lower portion of the reaction tank 10. The settling tank 16 is inclined downward. In addition, the sludge exhaust tube 48 is mounted on the bottom of the settling tank 16.

Accordingly, the sludge settled from the reaction tank 10 is concentrated in the settling tank 16 and exhausted through the sludge exhaust tube 48.

Furthermore, the circulation unit 18 for circulating the air and wastewater in the reaction tank 10 in a vertical direction is mounted on a side of the reaction tank 10.

The circulation unit 18 includes a pipe 54. An upper pipe 50 extending from the pipe 54 is connected to the upper space of the reaction tank 10. A middle pipe 52 is connected to a middle space of the reaction tank 10. A lower end of the pipe 54 is connected to the aeration apparatus 24. A circulation pump 56 is disposed on the pipe 54.

Accordingly, when the circulation pump 56 is driven, the wastewater and the sludge that are stored in the upper and lower spaces of the reaction thank 10 is sucked into the pipe 54 and exhausted to the lower space, thereby circulating the wastewater and the sludge stored in the upper and lower spaces of the reaction tank 10.

The circulation is periodically performed to obtain a circulation effect for circulating and the treated water and wastewater in the sludge can be circulated in each sludge separation part.

Meanwhile, the air exhaust unit 20 is provided to an opposite side of the reaction tank 10 to exhaust the air collected in the sludge separation parts 34 and 32. The air exhaust unit 20 includes a main pipe 60 along which the air flows and a sub-pipe 58 communicating with the staying spaces 44 and 46 of the sludge separation parts 34 and 32 by extending from the main pipe 60 into the reaction tank 10.

In the above-described air exhaust unit 20, by the sub-pipe 58 communicating with the staying spaces 44 and 46 of the sludge separation parts 34 and 32, the collected air is directed to the sub-pipe 58 and exhausted to the external side through the main pipe 60.

Therefore, the air exhaust unit 20 is usable when an anoxic reaction process such as a denitrification process that is performed by exhausting the air out of the reaction tank 10.

In this embodiment, although the guide member is employed to the sludge separation unit, the present invention is not limited to this case. That is, the guide member may be omitted in the present invention.

Figure 6:
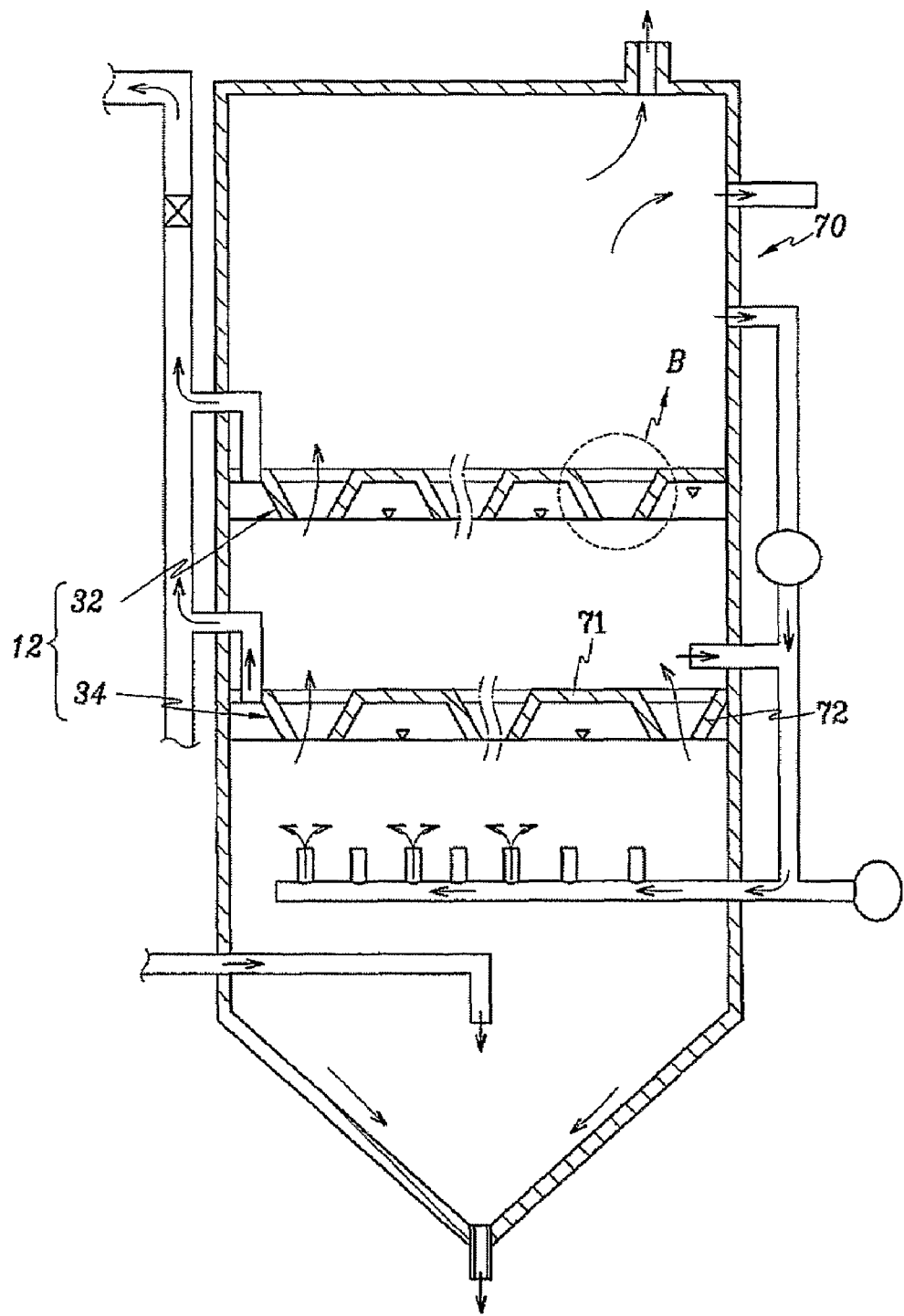
FIG. 6 is a side sectional view of a wastewater treatment plant according to another preferred embodiment of the present invention.
Figure 7:
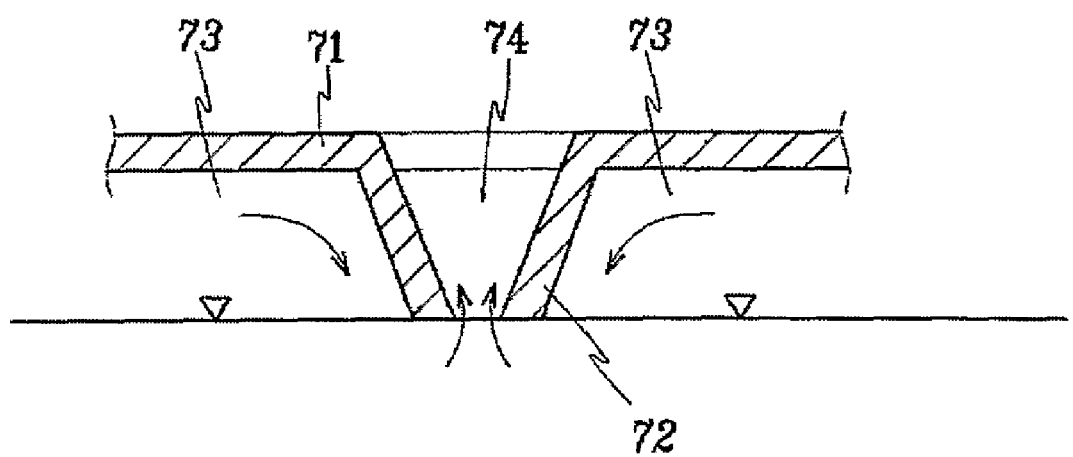
FIG. 7 is a partly enlarged sectional view of a portion "B" of FIG. 6.

That is, as shown in FIGS. 6 and 7, a sludge separation unit 12 having first and second sludge separation units 32 and 34 is provided in a wastewater separation unit 70.

Likewise the first embodiment, the sludge separation unit 12 divides the reaction tank 70 into upper and lower sections, including at least one plate 71 provided with a plurality of through holes 74, and a plurality of fluid flowing tubes 72 extending downward from the bottom of the plate 71 to allow the wastewater and air to pass therethrough.

The fluid flowing tube 72 is funnel-shaped, extending toward the bottom of the plate 71 by a predetermined length to form a plurality of staying spaces 73 enclosed by the fluid flowing tubes 72 on the bottom of the plate 40.

Therefore, the air ascending from the bottom of the reaction tank 70 is collected in the staying spaces 73. When a predetermined amount of the air is collected in the staying spaces 73, the air is dispersed in all directions by pressure to be directed to the fluid flowing tube 72.

Meanwhile, in the above-described embodiments, although a wastewater treatment process performed by injecting air into the reaction tank is described, the present invention is not limited to this. That is, instead of the air, gas such as ozone may be used to treat the wastewater.

Figure 8:
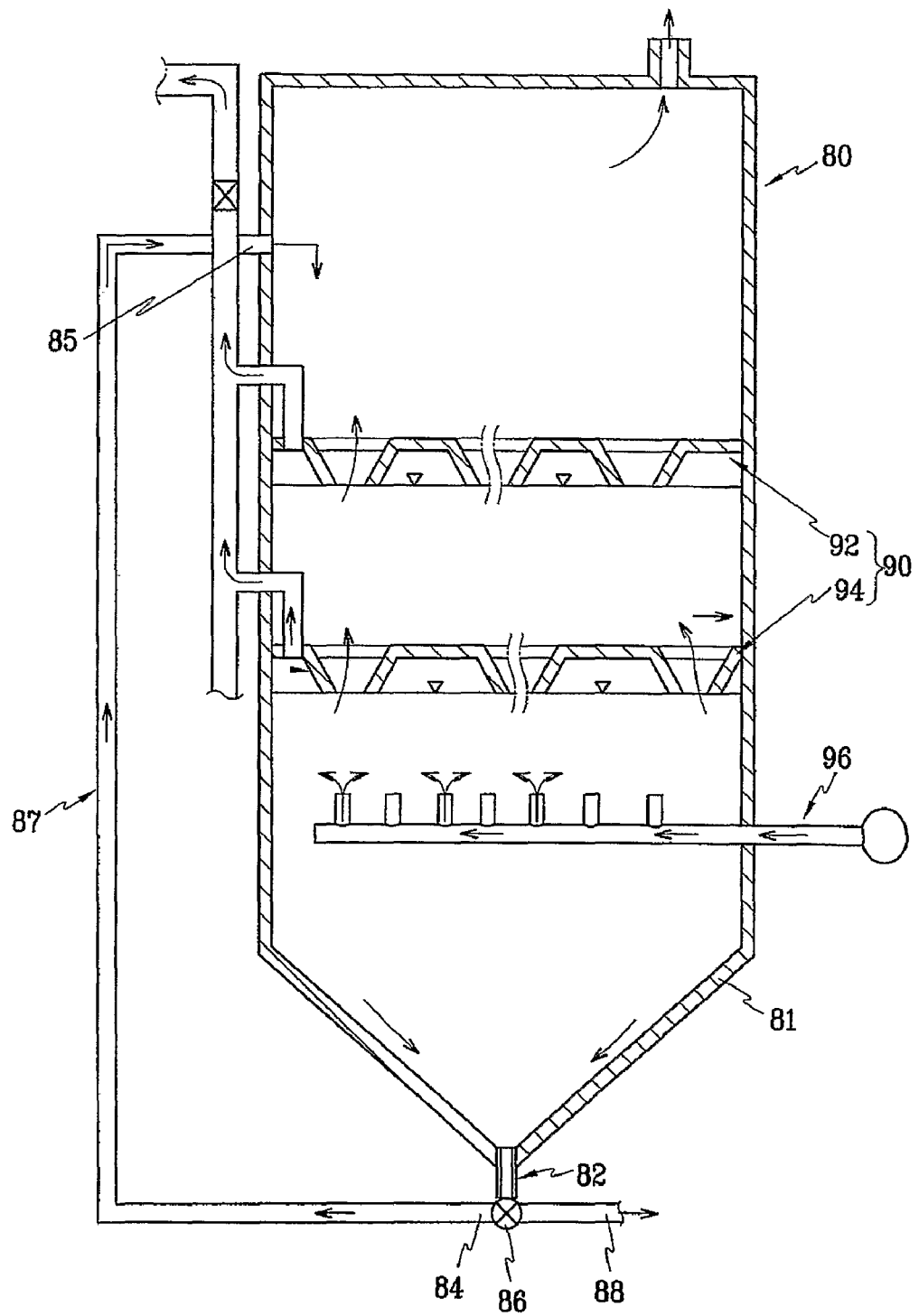
FIG. 8 is a side sectional view of a wastewater treatment plant according to another preferred embodiment of the present invention.

FIG. 8 shows a wastewater treatment plant that can treat the wastewater by injecting gas. As shown in the drawing, the wastewater treatment plant is designed to inject gas through an aeration apparatus similar to that of the forgoing embodiment. Instead of using the circulation unit 18 depicted in FIG. 1, a circulation tube 87 is provided.

That is, the gas such as ozone is injected through a gas injection tube and the injected gas is diffused upward and ascended through first and second separation units 94 and 92, in the, in the course of which, among the foreign objects, objects having a relatively high density are settled and objects having a relatively low density is moved upward, thereby realizing the separation process.

In addition, the settled foreign objects are returned to the upper section of the reaction tank 80 through the circulation tube 87 mounted on the lower portion of the settling tank 81 and retreated. One end of the circulation tube 87 is connected to the exhaust tube 82 of the settling tank 81 and the other end of the circulation tube 87 is connected to the upper section of the reaction tank 80.

Accordingly, when a value 86 is opened, the wastewater of the settling tank 81 is returned to the reaction tank 80 through the circulation tube 87, and at the same time, vacuum is applied on the lower section of the reaction tank 80 so that the gas such as the ozone can be easily directed into the reaction tank 80 through the gas injection tube 96.

That is, after the reaction tank 80 is fully filled with the wastewater and a large amount of treated water is exhausted in a moment from the lower section of the reaction tank 80 and returned to the upper section of the reaction tank 80 through the circulation tube 87. At this point, since the vacuum is applied in a moment to the lower section of the reaction tank 80, the outer gas can be easily introduced.

After a predetermined amount of gas is introduced, the flow rate of the wastewater is reduced to promote the reaction between the gas and the wastewater. At this point, by the flow rate of the wastewater moving downward, the gas is changed into air bubbles and introduced to accelerate the dissolution of the gas.

As described above, since the density difference is incurred by the gas such as ozone as well as by the air, the foreign objects contained in the wastewater can be effectively separated.

The operation of the wastewater treatment apparatus according to an embodiment of the present invention will be described in more detail hereafter.

As shown in FIGS. 1 through 5b, wastewater to be treated is introduced into the reaction tank 10 through the wastewater supply tube 22 and the outer air is also introduced into the reaction tank 10 through the aeration apparatus 24. At this point, since the aeration apparatus 24 is located above the wastewater supply tube 22, the solid matters cannot be ascended by air sprayed from the aeration apparatus 24 but settled, thereby removing the solid matters in advance.

The air injected to the aeration apparatus 24 is uniformly sprayed by the plurality of nozzles 28, the aeration process can be effectively realized.

As described above, the wastewater and air introduced into the reaction tank 10 are ascended to reach the first sludge separation part 34.

The wastewater reached the first sludge separation part 34 is introduced into the guide member 35 through the space D defined between the edge plate 37 and the water surface.

In the course of introducing the wastewater and air into the guide member 35 through the space D, the wastewater and air are consecutively in contact with the stay spaces 44 and 46 above the water surface, thereby increasing the gas-liquid ratio. The increase of the gas-liquid ratio increases the dissolution speed of a material having a relatively low solubility.

In addition, by properly adjusting the length L of the edge plate 37, the wastewater and air introduced through the space D may be increased in the solubility.

As described above, the wastewater and air introduced into the guide member 35 may be directed into the fluid flowing tube 42 in a state where they are dissolved.

At this point, the air is ascended by buoyancy and collected in the staying spaces 44 and 46 formed under the plate 40. At this point, the staying spaces 44 and 46 are defined at a lowermost bottom of the fluid flowing tube 42. Accordingly, a water level of the wastewater is to be identical to a lowest portion of the fluid flowing tube 42.

In addition, since fluid must be uniformly moved through the fluid flowing tube 42, the lengths and diameters of the funnel-shaped fluid flowing tubes 42 should be identical to each other.

Since a starting point where the material existed on the bottom of the reaction tank 10 starts moving upward is the lowermost bottom of the fluid flowing tube 42, the highest density material in the bubble and air and the lowest density material contained in the wastewater are separated by the buoyancy and moved upward.

In addition, when only the wastewater is injected and circulated without injecting the air, the relatively low-density material contained in the wastewater is primarily move by the buoyancy.

Each density difference is determined by the length of the funnel-shaped fluid flowing tube 42 as well as by surface tension. That is, the density difference is increased as the depth and water surface area of the fluid flowing tube 42 is increased.

By the above-described structural features, the bubbles generated in the reaction tank 10 mostly stay at an upper end of the wastewater. At the water surface of the wastewater is composed of a low-density material by the surface tension thereof.

Accordingly, since low-density materials are disposed at an upper portion of each layer, the material separation where the material density is lowered as it goes upward is realized. A predetermined amount of the air and pressure is introduced to the lower portion so that the air and pressure can be uniformly exhausted through the fluid flowing tube 42.

Through the above-described processes, the wastewater and air passing through the first sludge separation part 34 reaches the second sludge separation part 32. In the course of passing through the second sludge separation part 32, the wastewater and air go through processes identical to that in the first sludge separation part 34, thereby realizing the material separation.

The wastewater and air reached to the uppermost space of the reaction tank 10 are exhausted to the external side through the air exhaust tube 14 and the wastewater exhaust tube 15.

Meanwhile, when an anaerobic tank operation is required after the above-described air-bubbling process, the denitrification may be performed by exhausting air using the air exhaust unit 20.

That is, in order to realize the denitrification after the air bubbling, the air remained in the reaction tank 10 must be first eliminated. To realize this, the valve of the main pipe 60 is opened to exhaust the residual air and bubbles that are collected in the staying spaces 44 and 46 of the first and second sludge separation parts 34 and 32 through the sub-pipe 58. At this point, in order to prevent the exhausting air from moving upward by the buoyancy, the pipe 60 must be distant from the upper wall.

When the valve is opened, the air and bubbles in each layer are exhausted to original outer water through the main pipe 60.

As a result, the anaerobic tank operation can be performed after the denitrification is realized through the air exhaust process.

Meanwhile, when the reaction tank 10 is operated for a predetermined time, since the sludge is concentrated in the first and second sludge separation parts 34 and 32, the circulation unit 18 should be operated to circulate the wastewater, thereby increasing the concentration efficiency of the lower end portion as well as the denitrification efficiency.

That is, when the circulation pump 56 of the circulation unit 18 is operated, the sludge concentrated at each layer is sucked through the upper portion of the pipe 54 and the intermediate pipes 50 and 52.

The sucked sludge is supplied to the aeration apparatus 24 through the pipe 54 and returned to the reaction tank 10.

Accordingly, through the above-described circulation process, unlikely when the air is injected, the sludge is largely collected at the lower end by the movement of the wastewater itself, thereby increasing the concentration efficiency at the lower end and incurring the sludge concentration difference at the upper and lower ends. In this process, the denitrification is realized and the circulation may be realized through the uppermost and lowermost ends or the middle portion and uppermost end.

The point of time for exhausting wastewater may a point of time where the circulation is finished or the air bubbling is finished. Sometimes, the wastewater may be consecutively introduced and exhausted. The point of time for exhausting the sludge is determined according to the sludge concentration in the reaction tank 10. That is, depending on the sludge concentration, the sludge may be intermittently or consecutively exhausted.

Since the fluid flow is incurred in a state where an air bubbling equipment is located on an upper end of the concentrated sludge exhaust hole, no channel phenomenon is incurred in the sludge even when the sludge is directed downward without a scrapper. The sludge concentration tank may be formed in a variety of sizes regardless of the treatment capacity.

As described above, the inventive wastewater treatment plant includes the sludge separation unit 12 increasing the sludge separation efficiency as well as the dissolved oxygen efficiency, being designed to purify the introduced wastewater and air bubbles by ascending the same. That is, the inventive wastewater treatment plant is an upward flow type.

When the treated water is circulated to the upper section of the reaction tank and the wastewater and air bubbles are directed from the upper section to the lower section, the inventive wastewater treatment plant is a downward flow type.

| | Test Condition | | | |
|---|---|---|---|---|
| Test method | Reaction Tank Volume (Treatment Temperature) | Wastewater inflow water/outflow water concentration (mg/L) | Treatment Time (day) | Remark |
| Aerobic Treatment | 10 L (20° C.) | Wastewater water BOD 22000/500 | 1 | Oxygen Transmitting rate 30-40% |

As described above, the inventive wastewater treatment plant has advantages as follows:

1. By providing the guide member to the sludge separation unit provided in the reaction tank, the solubility of the wastewater and air can be remarkably improved.

2. By providing the sludge separation unit having the funnel-shaped fluid flowing tube in the reaction tank, the moving distance and staying time of the bubbles are increased, thereby increasing the dissolved oxygen transmitting rate and agitating efficiency.

3. Since the sludge is separately concentrated at upper and lower sections by the density difference of the sludge, the density of the organic matters, dissolved oxygen and microorganism is increased as it goes upward, thereby remarkably reducing the wastewater treatment time.

4. Since no channel phenomenon is incurred in the sludge, the concentrated sludge is continuously exhausted from the lowermost end without any scrapper.

5. By allowing the bubbles to stay at the upper portion of each section for a long time to increase the air bubbling efficiency, the staying time of the bubbles is increased, and at the same time, the bubbles are exhausted during the denitrification, thereby easily realizing the oxygen-free state. That is, it is easy to change to aerobic state or anaerobic state.

6. Nitrogen gas is accumulated around the pipe during the denitrification and low-density matters existed on the surface of the sludge moves upward, the low-density wastewater uniformly passes through the funnel shaped tube. In addition, the low-density matters pass through the fixed sludge layer to realize PFR flow of the fluid, thereby increasing the denitrification efficiency.

7. The inventive wastewater treatment plant can be easily constructed in a relatively small area and applied for the mass treatment.

8. The air bubbling can be realized using relatively low operational power.

9. Since it is possible to optionally exhaust the sludge from the lower portion, the density of the sludge can be adjusted to be proper to the inflow wastewater property at the lower end.

10. The plant can be operated in a consecutive or non-consecutive, high-density wastewater that is not easily dissolved can be properly treated.

11. Since the density difference is incurred by gas such as ozone as well as air, the foreign objects contained in the wastewater can be effectively separated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A wastewater treatment plant comprising:
a reaction tank connected to an wastewater supply tube and an aeration apparatus to receive wastewater therein;
a sludge separation unit dividing an internal space of the reaction tank into upper and lower sections to increase an amount of dissolved oxygen by increasing an contact area of the wastewater and bubbles and to separate relatively light materials by moving low density matters existed on a surface of each section upward in turn;
an air exhaust tube mounted on the reaction tank to exhaust bubbles passing through the sludge separation unit out of the reaction tank;
a treated water exhaust tube mounted on the reaction tank to exhaust the wastewater that is treated by passing through the sludge separation unit; and
a settling tank provided on a bottom of the reaction tank to concentrate and exhaust the settled sludge,
wherein the sludge separation unit comprises first and second sludge separation parts, each other first and second sludge separation part comprising a plate dividing an inner space of the reaction tank into upper and lower sections and provided with a plurality of through holes, a plurality of fluid flowing tubes formed on a bottom of the plate to define the staying space collecting the gas and to allow the wastewater and the gas to flow along thereof, and a plurality of guide members provided under the fluid flowing tubes to improve the solubility of the air, whereby, when the gas and the wastewater moves upward to reach the sludge separation unit, low density matters contained in the air is collected in the staying space and high density matters contained in the wastewater is remained in the lower section, thereby primarily moving the low density matters existed on a surface of the sludge separation unit, and
wherein each of the fluid flowing tubes comprises a sidewall and a bottom wall coupled to the sidewall and having a center hole, each of the guide members comprises a bottom plate, an edge plate, a side plate coupled between the bottom plate and the edge plate, and the edge plate is located under the bottom wall of the fluid flowing tube and comprises a connecting bar connected to the bottom wall of the fluid flowing tube and the bottom plate of the guide member.

2. The wastewater treatment plant of claim 1 wherein each of the fluid flowing tube is formed in a funnel shape, a diameter of which is reduced at it goes downward.

3. The wastewater treatment plant of claim 1, wherein the aeration apparatus is provided at a first end located in the reaction tank with an air spraying nozzle and at a second end located out of the reaction tank with a blower.

4. The wastewater treatment plant of claim 1, further comprising a circulation unit provided on a side of the reaction tank to allow the settled matters at each section of the container to circulate or settled on a lower portion, the circulation unit comprising a main pipe, a circulation pump mounted on the main pipe and upper, middle and lower pipes extending from the main pipe and connected to each section of the reaction tank.

5. The wastewater treatment plant of claim 1, further comprising an air exhaust unit provided on another side of the reaction tank to selectively exhaust air and bubbles collected in a staying space formed at each section of the reaction tank, the air exhaust unit comprising a main pipe, a valve mounted on the main pipe to close or open the main pipe, and a sub-pipe extending from the main pipe and communicating with the staying space formed at each section of the reaction tank.

6. A wastewater treatment plant comprising:
a reaction tank connected to an wastewater supply tube and an aeration apparatus to receive wastewater and gas and to exhaust treated wastewater through a settling tank mounted on a bottom of the reaction tank;
a sludge separation unit dividing an internal space of the reaction tank into upper and lower sections to increase an amount of dissolved oxygen by increasing an contact area of the wastewater and gas bubbles, to separate the wastewater from the gas by collecting the gas in a staying space, and to dissolve polluted matters by allowing the wastewater and the sludge contained in the gas to move upward by a density difference;

a sensor provided on the sludge separation unit to detect an amount of gas collected in the staying space and to output a signal corresponding to the amount of the gas;

an gas exhaust tube mounted on the reaction tank to exhaust bubbles passing through the sludge separation unit out of the reaction tank in accordance with the signal from the sensor;

a treated water exhaust tube mounted on the reaction tank to exhaust the wastewater that is treated by passing through the sludge separation unit; and a gas injection pipe mounted on a side of the reaction tank to control the injection of the gas into the reaction tank, wherein the sludge separation unit comprises first and second sludge separation parts, each other first and second sludge separation part comprising a plate dividing an inner space of the reaction tank into upper and lower sections and provided with a plurality of through holes, a plurality of fluid flowing tubes formed on a bottom of the plate to define the staying space collecting the gas and to allow the wastewater and the gas to flow along thereof, and a plurality of guide members provided under the fluid flowing tubes to improve the solubility of the air, whereby, when the gas and the wastewater moves upward to reach the sludge separation unit, low density matters contained in the air is collected in the staying space and high density matters contained in the wastewater is remained in the lower section, thereby primarily moving the low density matters existed on a surface of the sludge separation unit, and wherein each of the fluid flowing tubes comprises a sidewall and a bottom wall coupled to the sidewall and having a center hole, each of the guide members comprises a bottom plate, an edge plate, a side plate coupled between the bottom plate and the edge plate, and the edge plate is located under the bottom wall of the fluid flowing tube and comprises a connecting bar connected to the bottom wall of the fluid flowing tube and the bottom plate of the guide member.

7. The wastewater treatment plant of claim 6, wherein the gas injection tube is provided at a first end located in the reaction tank with at least one gas spraying nozzle and at a second end located out of the reaction tank with a blower.

8. The wastewater treatment plant of claim 6, wherein a circulation tube is provided on the reaction tank to return the treated wastewater to the reaction tank and make the gas intake easy and the circulation tube has a first end connected to a lower portion of the settling tank and a second end connected to an upper portion of the reaction tank.

9. The wastewater treatment plant of claim 6, wherein each of the fluid flowing tube is formed in a funnel shape, a diameter of which is reduced at it goes downward.

10. A wastewater treatment plant comprising:

a reaction tank connected to an wastewater supply tube and an aeration apparatus to receive wastewater therein;

a sludge separation unit dividing an internal space of the reaction tank into upper and lower sections to increase an amount of dissolved oxygen by increasing an contact area of the wastewater and bubbles and to separate relatively light materials by moving low density matters existed on a surface of each section upward in turn;

an air exhaust tube mounted on the reaction tank to exhaust bubbles passing through the sludge separation unit out of the reaction tank;

a treated water exhaust tube mounted on the reaction tank to exhaust the wastewater that is treated by passing through the sludge separation unit; and a settling tank provided on a bottom of the reaction tank to concentrate and exhaust the settled sludge, wherein the sludge separation unit comprises first and second sludge separation parts, each other first and second sludge separation part comprising a plate dividing an inner space of the reaction tank into upper and lower sections and provided with a plurality of through holes, a plurality of fluid flowing tubes formed on a bottom of the plate to define the staying space collecting the gas and to allow the wastewater and the gas to flow along thereof, and a plurality of guide members provided under the fluid flowing tubes to improve the solubility of the air, whereby, when the gas and the wastewater moves upward to reach the sludge separation unit, low density matters contained in the air is collected in the staying space and high density matters contained in the wastewater is remained in the lower section, thereby primarily moving the low density matters existed on a surface of the sludge separation unit, and wherein each of the fluid flowing tubes comprises a lower end having a saw-toothed shape.

11. The wastewater treatment plant of claim 10, wherein each of the fluid flowing tube is formed in a funnel shape, a diameter of which is reduced at it goes downward.

12. The wastewater treatment plant of claim 10, wherein the aeration apparatus is provided at a first end located in the reaction tank with an air spraying nozzle and at a second end located out of the reaction tank with a blower.

13. The wastewater treatment plant of claim 10, further comprising a circulation unit provided on a side of the reaction tank to allow the settled matters at each section of the container to circulate or settled on a lower portion, the circulation unit comprising a main pipe, a circulation pump mounted on the main pipe and upper, middle and lower pipes extending from the main pipe and connected to each section of the reaction tank.

14. The wastewater treatment plant of claim 10, further comprising an air exhaust unit provided on another side of the reaction tank to selectively exhaust air and bubbles collected in a staying space formed at each section of the reaction tank, the air exhaust unit comprising a main pipe, a valve mounted on the main pipe to close or open the main pipe, and a sub-pipe extending from the main pipe and communicating with the staying space formed at each section of the reaction tank.

* * * * *